US012293680B2

(12) United States Patent
Jing

(10) Patent No.: US 12,293,680 B2
(45) Date of Patent: May 6, 2025

(54) INFLATABLE ORNAMENT

(71) Applicant: Life Ideas Company Ltd, Jiangmen (CN)

(72) Inventor: Shouxiong Jing, Jiangmen (CN)

(73) Assignee: Life Ideas Company LTD, Jiangmen (CN)

( * ) Notice: Subject to any disclaimer, the term of this patent is extended or adjusted under 35 U.S.C. 154(b) by 23 days.

(21) Appl. No.: 18/507,614

(22) Filed: Nov. 13, 2023

(65) Prior Publication Data

US 2024/0371303 A1 Nov. 7, 2024

(30) Foreign Application Priority Data

May 4, 2023 (CN) ......................... 202321049066.0
May 4, 2023 (CN) ......................... 202321049090.4

(51) Int. Cl.
*G09F 19/08* (2006.01)
*G09F 19/00* (2006.01)

(52) U.S. Cl.
CPC ............ *G09F 19/08* (2013.01); *G09F 19/008* (2021.05)

(58) Field of Classification Search
CPC ............................... G09F 19/08; G09F 19/008
See application file for complete search history.

(56) References Cited

U.S. PATENT DOCUMENTS

| | | | | |
|---|---|---|---|---|
| 6,447,361 B1 * | 9/2002 | Akiyama | A63H 27/10 137/625.21 |
| 6,786,793 B1 * | 9/2004 | Wang | A63H 27/10 446/176 |
| 11,170,674 B1 * | 11/2021 | Wu | G09F 13/34 |
| 11,691,088 B1 * | 7/2023 | Gu | A63H 3/006 446/220 |
| 2001/0013188 A1 * | 8/2001 | Hall | G09F 19/08 40/610 |
| 2005/0047119 A1 * | 3/2005 | Fan | G09F 19/08 362/124 |
| 2006/0037225 A1 * | 2/2006 | Wei | G09F 19/08 40/610 |
| 2006/0111012 A1 * | 5/2006 | Machala | G09F 19/08 446/226 |
| 2006/0150451 A1 * | 7/2006 | Spielberger | A63H 3/06 446/178 |

(Continued)

*Primary Examiner* — Gary C Hoge
(74) *Attorney, Agent, or Firm* — Justin Lampel

(57) ABSTRACT

An inflatable ornament is disclosed, including an inflatable body. The inflatable body is surrounded by a membrane material, an inflatable fan is arranged on the inflatable body, the inflatable body expands after being inflated. A first swinging portion is arranged on the inflatable body, the first swinging portion is connected with the inflatable body, a swinging drive is arranged in the first swinging portion, and the swinging drive drives the first swinging portion to swing. A second swinging portion is connected with the inflatable body, the second swinging portion is connected with the first swinging portion via at least one connecting piece. When the first swinging portion swings, the first swinging portion drives the second swinging portion to swing via the connecting piece. The swinging structure is simple and is not easy to be damaged, thereby reducing the production cost and prolonging the service life of a product.

10 Claims, 5 Drawing Sheets

(56) References Cited

U.S. PATENT DOCUMENTS

| | | | | |
|---|---|---|---|---|
| 2007/0207697 | A1* | 9/2007 | Chin | G09F 19/08 446/175 |
| 2014/0130385 | A1* | 5/2014 | Zhang | G09F 19/02 40/412 |
| 2014/0148079 | A1* | 5/2014 | Zhang | A63H 13/02 446/226 |
| 2017/0056779 | A1* | 3/2017 | Zhang | F16K 11/0525 |

* cited by examiner

INFLATABLE ORNAMENT

CROSS-REFERENCE TO RELATED APPLICATIONS

This application is based on and claims the benefit of priority from Chinese Patent Applications No. 2023210490904 and No. 2023210490660, both filed on 4 May 2023, the entireties of which are incorporated by reference herein.

TECHNICAL FIELD

The disclosure relates to the technical field of inflatable products, and in particular to an inflatable ornament.

BACKGROUND

Whenever some special days are coming, people like to decorate bionic modeling ornaments of symbolic significance to enhance a festive and auspicious atmosphere. These modeling ornaments mainly include figure modeling ornaments and animal modeling ornaments, such as auspicious pandas, which are generally provided with main components such as a head, a trunk and even limbs. In order to appear more realistic and friendly, outer layers of the ornaments are all wrapped in various clothing fabrics.

Swinging action of the existing inflatable ornament is mainly implemented by arranging a swinging mechanism at a head or a tail of the inflatable ornament. Such swinging structure needs to use a complicated swinging arm mechanism. If the head and the tail need to swing at the same time, multiple sets of driving devices and transmission devices need to be provided, which is not conducive to saving costs, and is difficult to ensure synchronization of the head and the tail swinging.

SUMMARY

The disclosure aims at solving at least one of the technical problems in the prior art. For this purpose, the disclosure proposes an inflatable ornament, which can improve synchronization when the inflatable ornament completes the swinging action, reduce the manufacturing cost of the inflatable ornament and save a space occupied by a swinging mechanism.

An inflatable ornament is provided according to an embodiment in a first aspect of the disclosure, which comprises a first swinging portion, wherein the first swinging portion is connected with the inflatable body, a swinging drive is arranged in the first swinging portion, and the swinging drive drives the first swinging portion to swing; and a second swinging portion connected with the inflatable body, wherein the second swinging portion is connected with the first swinging portion via at least one connecting piece, and when the first swinging portion swings, the first swinging portion drives the second swinging portion to swing via the connecting piece.

The inflatable ornament, according to the embodiment of the disclosure, at least has the following beneficial effects. The inflatable body is surrounded by a membrane material, the membrane material may be set into various shapes through different stitching, so as to improve interest of the inflatable ornament. The inflatable body is respectively connected with the first swinging portion and the second swinging portion. A swinging drive is arranged in the first swinging portion, the swinging drive can drive the first swinging portion to complete a swinging action, thereby improving entertainment of the inflatable ornament. The first swinging portion and the second swinging portion are connected with each other via the connecting piece. When the first swinging portion swings, the second swinging portion may be driven to swing, which can reduce the manufacturing cost of the inflatable ornament, without setting the swinging drives at the head and the tail of the inflatable ornament, so that a weight of the inflatable ornament can be reduced and a space utilization rate of the inflatable ornament can be improved.

According to some embodiments of the disclosure, the connecting piece is at least one of a connecting rod or a connecting belt. Using the connecting rod or the connecting belt can save the manufacturing cost of the inflatable ornament, and facilitate the mounting of the connecting piece, which can save labor costs.

According to some embodiments of the disclosure, the connecting piece comprises a first connecting piece and a second connecting piece;

- the first swinging portion comprises a first swinging side and a second swinging side oppositely arranged along a swinging direction;
- the second swinging portion comprises a third swinging side and a fourth swinging side oppositely arranged along the swinging direction; and
- the first connecting piece is connected with the first swinging side and the third swinging side, and the second connecting piece is connected with the second swinging side and the fourth swinging side. When the first swinging portion swings, the second swinging portion is driven by the connecting piece to swing, so as to enable the inflatable ornament to complete the swinging action.

According to some embodiments of the disclosure, the inflatable body is provided with a tightness adjusting device, and the tightness adjusting device is connected with the connecting piece and is used for adjusting a distance between the first swinging portion and the second swinging portion. The tightness adjusting device can adjust the distance between the first swinging portion and the second swinging portion, which is convenient to mount the connecting piece.

According to some embodiments of the disclosure, when the connecting piece is a connecting belt, the tightness adjusting device is a connecting shaft, the connecting belt is wound around the connecting shaft for a plurality of turns, and an outer wall of the connecting shaft is provided with an adjusting groove, shapes of the adjusting groove and the connecting belt are matched with each other, and the adjusting groove spirally extends along a direction of a center line of the connecting shaft. The spiral adjusting groove can reduce a friction force between the connecting belt and the adjusting groove, so that the connecting belt is smoother when operating.

According to some embodiments of the disclosure, the first swinging portion comprises a first airbag and a second airbag arranged oppositely, the swinging drive comprises a first fan and a second fan, the first fan is arranged in the first airbag, the second fan is arranged in the second airbag, the first fan and the second fan are alternately turned on to alternately expand the first airbag and the second airbag, the first swinging portion is driven to swing in a direction of the second airbag when the first airbag expands, and the first swinging portion is driven to swing in a direction of the first airbag when the second airbag expands. When the first airbag and the second airbag are alternately inflated, the inflatable ornament can perform the swinging action, which can prolong the service life of the inflatable ornament.

According to some embodiments of the disclosure, further comprising a controller, the controller is connected with the first fan and the second fan respectively, and the controller is used for controlling the first fan and the second fan to work or stop alternately. The controller can also better adjust working modes of the first fan and the second fan, which is convenient for a user to adjust a swinging frequency and amplitude of the inflatable ornament, and thus further improving the interest of the inflatable ornament.

According to some embodiments of the disclosure, further comprising a proximity sensor, the proximity sensor is connected with the controller, when the proximity sensor senses that a person approaches the inflatable ornament, the proximity sensor feeds back a signal to the controller, and the controller controls the first fan and the second fan to work alternately. The proximity sensor can enable the inflatable ornament to work automatically and improve interactivity.

According to some embodiments of the disclosure, a timing module is arranged in the controller, and when a flowing time reaches a time set by the timing module, the controller controls the first fan and the second fan to work alternately. The timing module in the controller can enable the first fan and the second fan to automatically start working according to a signal of the timing module, thus improving an application range of the inflatable ornament.

According to some embodiments of the disclosure, a delay module is arranged in the controller, when the controller controls the first fan and the second fan to work, the delay module starts timing, and when the delay module reaches a set time, the controller controls the first fan and the second fan to stop. The delay module in the controller can enable the first fan and the second fan to automatically stop working according to the signal of the delay module, thus saving energy consumption.

The additional aspects and advantages of the disclosure will be partially given in the following description, and will be partially apparent from the following description, or will be understood via the practice of the application.

BRIEF DESCRIPTION OF THE DRAWINGS

The disclosure will be further illustrated in conjunction with the accompanying drawings and the embodiments, wherein.

REFERENCE NUMERALS

Figure 1:
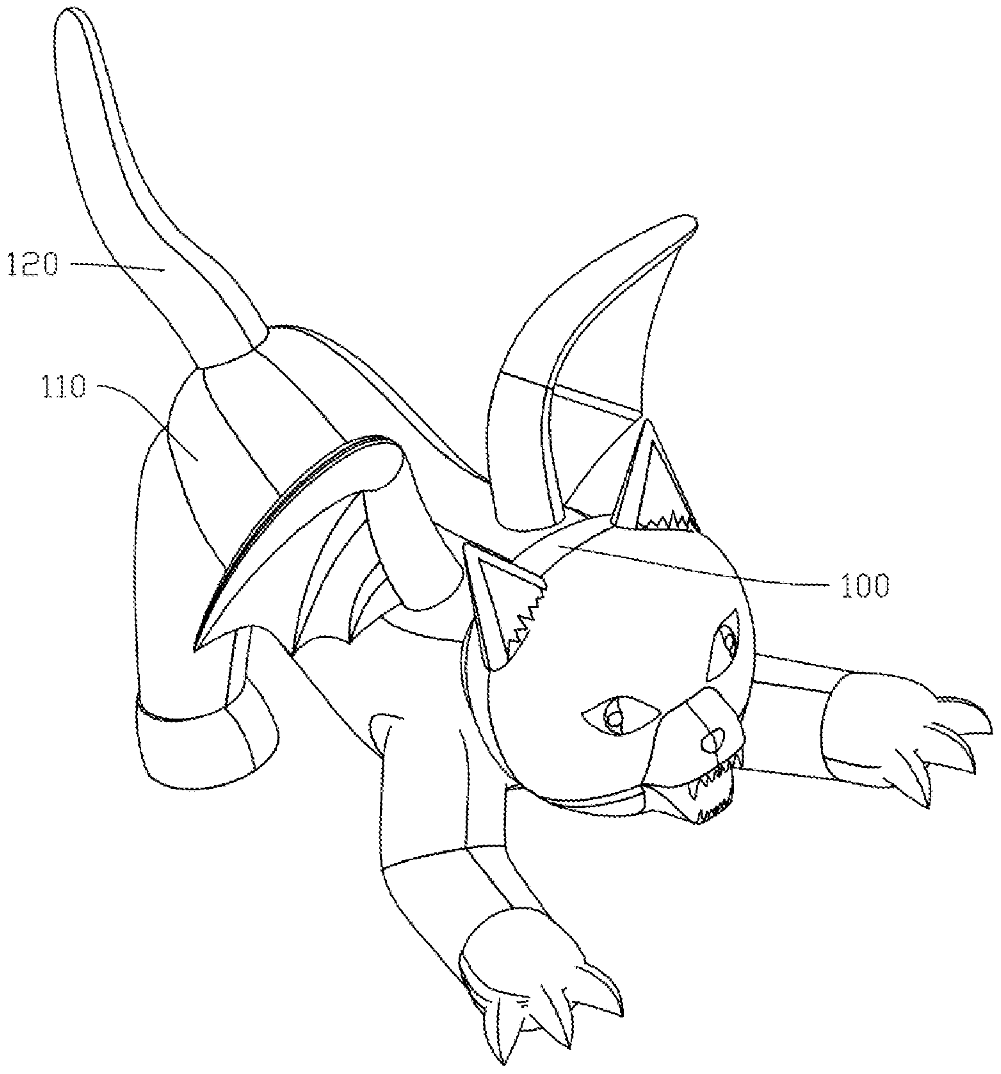
FIG. 1 is a three-dimensional schematic diagram of an inflatable ornament according to an embodiment of the disclosure.

100 refers to first swinging portion; 110 refers to inflatable body; 120 refers to second swinging portion; 130 refers to first fan; 140 refers to second fan; 150 refers to first swinging side; 160 refers to second swinging side; 170 refers to third swinging side; 180 refers to fourth swinging side; 190 refers to first connecting piece; 200 refers to second connecting piece; 210 refers to first airbag; 220 refers to second airbag; 230 refers to inflatable fan; 240 refers to swinging drive; 250 refers to connecting piece; 260 refers to tightness adjusting device; and 270 refers to adjusting groove.

DETAILED DESCRIPTION

Embodiments of the disclosure will be described in detail below. Examples of the embodiments are illustrated in the accompanying drawings, where the same or like reference numerals throughout the figures indicate the same or like elements having the same or like functions. The embodiments described below with reference to the accompanying drawings are exemplary and are intended only to explain the disclosure instead of being construed as limiting the disclosure.

In the description of the disclosure, it should be understood that, descriptions relating to orientation, for example, orientation or positional relationships indicated by "up", "down", "front", "back", "left", "right", etc. are based on the orientation or positional relationships shown in the accompanying drawings, and are to facilitate the description of the disclosure and simplify the description only, rather than indicating or implying that the device or element referred to must have a specific orientation or be constructed and operated in a specific orientation, and therefore cannot be construed as limiting the disclosure.

In the description of the disclosure, the meaning of "several" is one or more, the meaning of "a plurality of" is two or more, "greater than", "less than", "more than", etc. are to be understood to exclude the given figure, and "above", "below", "within", etc. are understood to include the given figure. If "first" and "second", etc. are referred to, it is only for the purpose of distinguishing technical features, and shall not be understood as indicating or implying relative importance or implying the number of the indicated technical features or implying the sequence of the indicated technical features.

In the description of the disclosure, unless otherwise explicitly defined, the words such as "set", "install", and "connect" should be understood in a broad sense, and those skilled in the art can determine the specific meanings of the above words in the disclosure in a rational way in combination with the specific contents of the technical solutions.

Referring to FIG. 1 to FIG. 6, a swinging type inflatable ornament comprises an inflatable body 110, the inflatable body 110 is surrounded by a membrane material, an inflatable fan 230 is arranged on the inflatable body 110, the inflatable body 110 expands after being inflated, a first swinging portion 100 is connected with the inflatable body 110, a swinging drive 240 is arranged in the first swinging portion 100. A second swinging portion 120 is connected with the inflatable body 110, and is mounted at the other side of the first swinging portion 100, the second swinging portion 120 is connected with the swinging drive 240 via the connecting piece 250. When the swinging drive 240 swings, the swinging drive 240 drives the second swinging portion 120 to complete a swinging action.

The first swinging portion 100 is connected with the inflatable body 110, a swinging drive 240 is arranged in the first swinging portion 100, and the swinging drive 240 drives the first swinging portion 100 to swing; the second swinging portion 120 is connected with the inflatable body 110, the second swinging portion 120 is connected with the first swinging portion 100 via at least one connecting piece 250. When the first swinging portion 100 swings, the first swinging portion 100 drives the second swinging portion 120 to swing via the connecting piece 250. It should be understood that the swinging drive 240 may be driven by a swinging mechanism driven by a connecting rod, or two airbags may also be arranged in the first swinging portion 100 to inflate and deflate respectively to alternately swing.

The inflatable body 110 is surrounded by a membrane material, the membrane material may be set into various shapes through different stitching, so as to improve interest of the inflatable ornament. The inflatable body 110 is respectively connected with the first swinging portion 100 and the second swinging portion 120. The swinging drive 240 is arranged in the first swinging portion 100, the swinging drive 240 may drive the first swinging portion 100 to complete the swinging action, thereby improving entertainment of the inflatable ornament. The first swinging portion 100 and the second swinging portion 120 are connected with each other via the connecting piece 250. When the first swinging portion 100 swings, the second swinging portion 120 may be driven to swing, which can reduce the manufacturing cost of the inflatable ornament, without setting the swinging drives 240 at the head and the tail of the inflatable ornament, so that the weight of the inflatable ornament can be reduced and a space utilization rate of the inflatable ornament can be improved.

Figure 2:
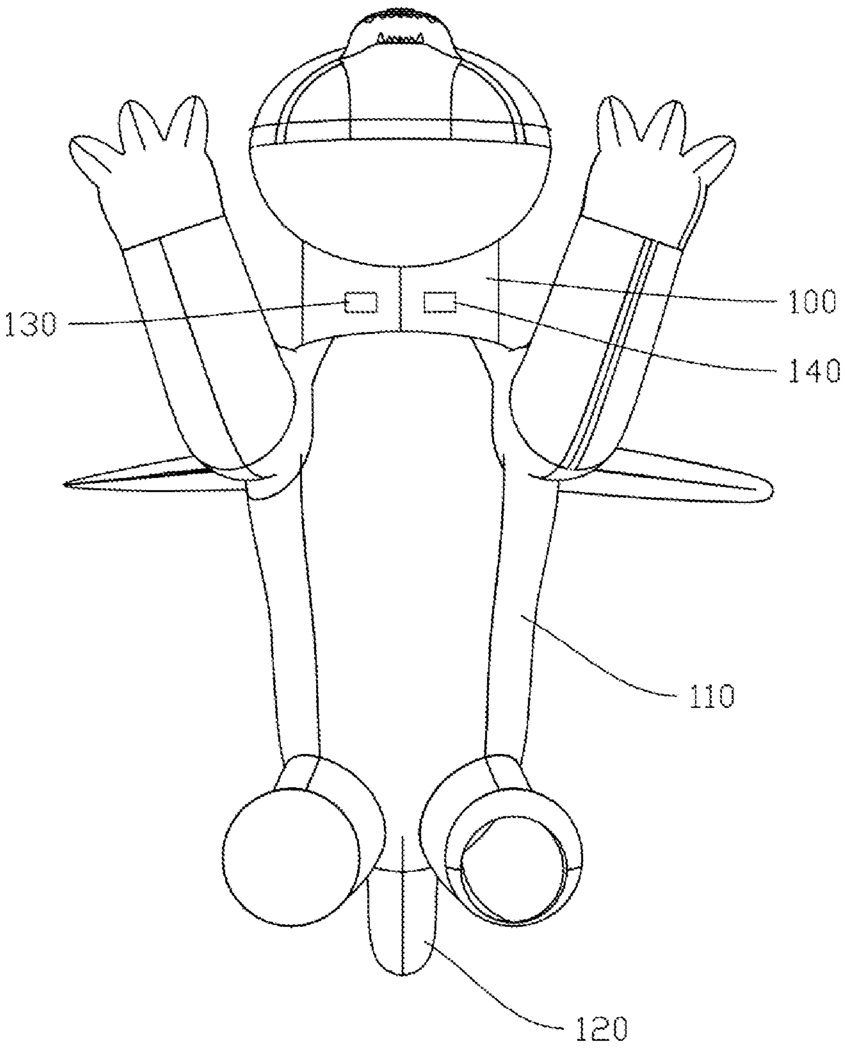
FIG. 2 is a schematic diagram of a bottom of the inflatable ornament shown in FIG. 1.

Referring to FIG. 2, the first swinging portion 100 consists of a first swinging side 150 and a second swinging side 160 oppositely arranged. The first swinging side 150 drives the first swinging portion 100 to move in a direction far away from the second swinging side 160, the second swinging side 160 drives the first swinging portion 100 to move in a direction far away from the first swinging side 150, and the first swinging side 150 and the second swinging side 160 are alternately acted to complete the swinging action.

Figure 3:
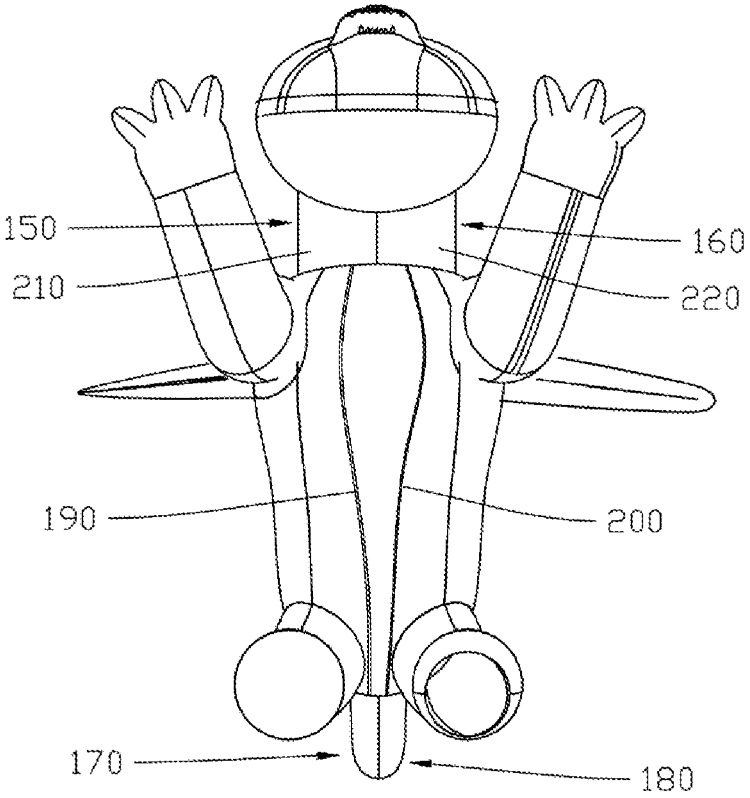
FIG. 3 is a first schematic diagram of an interior of the inflatable ornament shown in FIG. 1.
Figure 4:
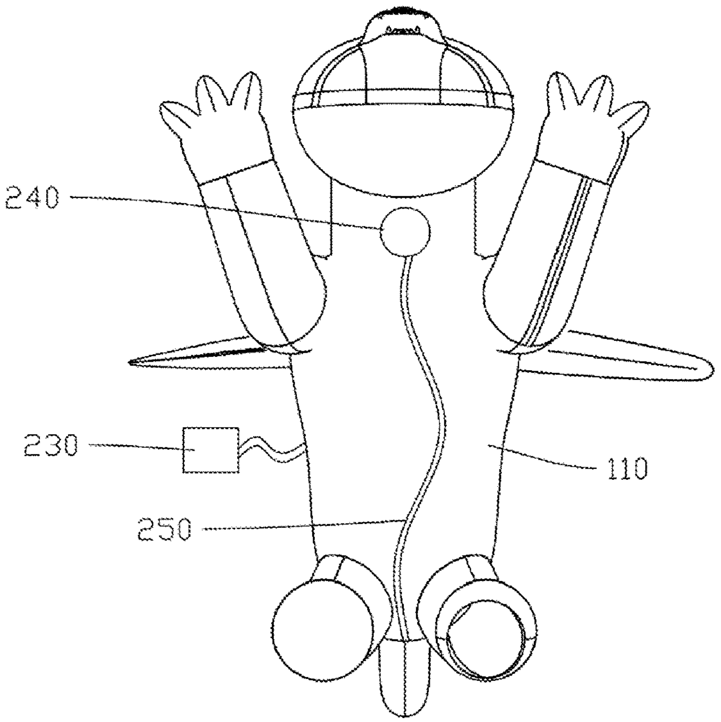
FIG. 4 is a second schematic diagram of the interior of the inflatable ornament shown in FIG. 1.

Referring to FIG. 2 to FIG. 4, the connecting piece 250 is at least one of a connecting rod or a connecting belt. Using the connecting rod or the connecting belt can save the manufacturing cost of the inflatable ornament, and facilitate the mounting of the connecting piece 250, which can save the labor cost. The connecting piece 250 comprises a first connecting piece 190 and a second connecting piece 200. The first swinging portion 100 comprises the first swinging side 150 and the second swinging side 160 oppositely arranged along a swinging direction. The second swinging portion 120 comprises a third swinging side 170 and a fourth swinging side 180 oppositely arranged along the swinging direction. The first connecting piece 190 is connected with the first swinging side 150 and the third swinging side 170, and the second connecting piece 200 is connected with the second swinging side 160 and the fourth swinging side 180. When the first swinging portion 100 swings, the second swinging portion 120 is driven by the connecting piece 250 to swing, so as to enable the inflatable ornament to complete the swinging action.

Figure 5:
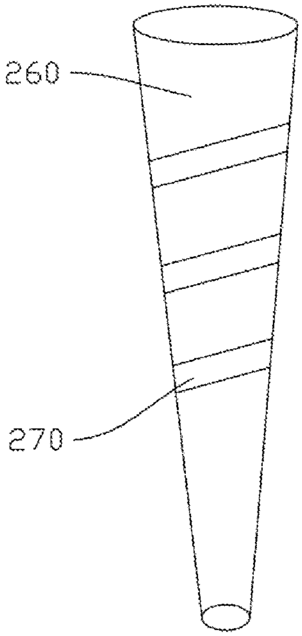
FIG. 5 is a schematic diagram of a tightness adjusting device.

Referring to FIG. 5, it should be understood that, the inflatable body 100 is provided with a tightness adjusting device 260, and the tightness adjusting device 260 is connected with the connecting piece 250 and is used for adjusting a distance between the first swinging portion 100 and the second swinging portion 120. The tightness adjusting device 260 can adjust the distance between the first swinging portion 100 and the second swinging portion 120, which facilitates the mounting of the connecting piece 250. When the connecting piece 250 is a connecting belt, the tightness adjusting device 260 is a connecting shaft, and the connecting belt is wound around the connecting shaft for a plurality of turns. The outer wall of the connecting shaft is provided with an adjusting groove 270, shapes of the adjusting groove 270 and the connecting belt are matched with each other, and the adjusting groove 270 spirally extends along a direction of a center line of the connecting shaft. The spiral adjusting groove 270 can reduce a friction force between the connecting belt and the adjusting groove 270, so that the connecting piece 250 is smoother when operating. It should be understood that the connecting rod may be a flexible connecting rod, and the flexible connecting rod may also be wound around the connecting shaft via the adjusting groove 270, and the flexible connecting rod is convenient to be stored. In some embodiments, the connecting rod may be an extendable rod, and the distance between the first swinging portion 100 and the second swinging portion 120 may be adjusted by changing the length of the extendable rod.

The first swinging portion 100 or the second swinging portion 120 is provided with a voice producing device, and the first swinging portion 100 drives the second swinging portion 120 to swing and enables the voice producing device to operate, which can improve the interest of the inflatable ornament. The first swinging portion 100 or the second swinging portion 120 is provided with a light-emitting device, which can improve the interactivity of the inflatable ornament.

Referring to FIG. 2, the first swinging portion 100 and the second swinging portion 120 are arranged at two farthest ends of the inflatable body 110. The swinging type inflatable ornament is animal-shaped, the first swinging portion 100 is one of a head or a tail of an animal model, and the second swinging portion 120 is the other of the head or the tail of the animal model. In the embodiment of FIG. 2, the first swinging portion 100 is arranged at the head of the inflatable ornament and the second swinging portion 120 is arranged at the tail of the inflatable ornament. In other embodiments, the first swinging portion 100 is arranged at the tail of the inflatable ornament and the second swinging portion 120 is arranged at the head of the inflatable ornament. The above arrangement can improve an adaptive environment of the inflatable ornament, the first swinging portion 100 may be arranged at the head or the tail, which is more vivid.

The first swinging portion 100 is provided with a first airbag 210 and a second airbag 220 arranged oppositely, a first fan 130 is arranged in the first airbag 210, a second fan 140 is arranged in the second airbag 220. The first fan 130 and the second fan 140 are alternately turned on to alternately expand the first airbag 210 and the second airbag 220. The first swinging portion 100 is driven to swing in a direction of the second airbag 220 when the first airbag 210 expands, and the first swinging portion 120 is driven to swing in a direction of the first airbag 210 when the second airbag 220 expands.

Referring to FIG. 1 to FIG. 4, it should be understood that an air inlet hole (not shown in the figures) is arranged in the inflatable body 110, the air inlet hole is connected with an inflatable fan 230, and the inflatable fan 230 can enable the inflatable body 110 to inflate and expand. The first airbag 210 and the second airbag 220 are independently arranged. After the inflatable fan 230 inflates the inflatable body 110, the first fan 130 supplies air to the first airbag 210 and the second fan 140 stops working. At this time, the first airbag 210 inflates to expand, the second airbag 220 is in a flat state, and the first airbag 210 slowly swings towards the second airbag 220. After the first airbag 210 completes the swinging action, the first fan 130 stops working, the second fan 140 enters a working state, and the second fan 140 supplies the air to the second airbag 220. At this time, the second airbag 220 inflates to expand, the first airbag 210 is in the flat state, and the second airbag 220 slowly swings towards the first airbag 210, to drive the first swinging portion 100 to move, and the first fan 130 and the second fan 140 work alternately, thus driving the first swinging portion 100 to complete a reciprocating motion.

The inflatable ornament of the disclosure is provided with a first airbag 210 and a second airbag 220 arranged oppositely. When the first airbag 210 and the second airbag 220 are alternately inflated, the inflatable ornament can perform the swinging action, which can provide a visual sense for a spectator and improve entertainment of the inflatable ornament. The first fan 130 supplies the air to the first airbag 210 and the second fan 140 supplies the air to the second airbag 220, which can improve inflation efficiency of the inflatable ornament, improve frequency of the swinging action of the inflatable ornament and interest of the inflatable ornament. The inflatable ornament uses the first airbag 210 and the second airbag 220 to realize the swinging action, which can prolong the service life of the inflatable ornament.

Figure 6:
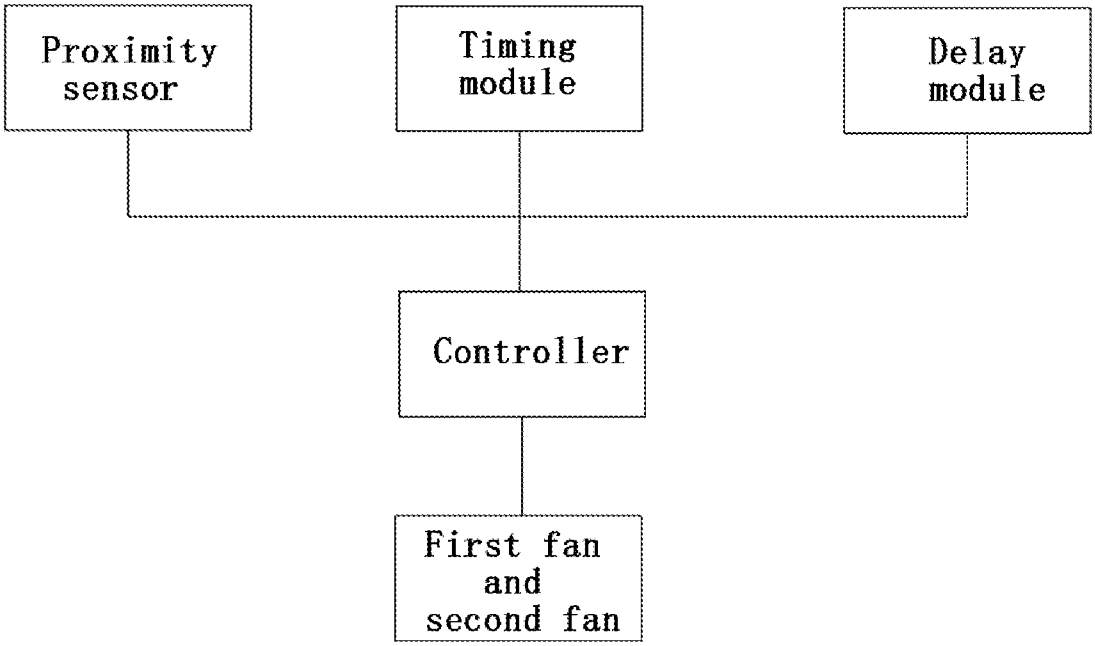
FIG. 6 is a schematic diagram showing connections of various components with a controller according to an embodiment of the disclosure.

Referring to FIG. 6, the inflatable ornament further comprises a controller, the controller is connected with the first fan 130 and the second fan 140 respectively, and the controller is used for controlling the first fan 130 and the second fan 140 to work or stop alternately. The controller may also better adjust working modes of the first fan 130 and the second fan 140, which is convenient for a user to adjust a swinging frequency and amplitude of the inflatable ornament, and thus further improving the interest of the inflatable ornament.

The inflatable ornament further comprises a proximity sensor, the proximity sensor is connected with the controller. When the proximity sensor senses that a person approaches the inflatable ornament, the proximity sensor feeds back a signal to the controller, and the controller controls the first fan 130 and the second fan 140 to work alternately. The proximity sensor can enable the inflatable ornament to work automatically and improve interactivity.

A timing module is arranged in the controller, and when the flowing time reaches a time set by the timing module, the controller controls the first fan 130 and the second fan 140 to work alternately. The timing module in the controller can enable the first fan 130 and the second fan 140 to automatically start working according to a signal from the timing module, thus improving the application range of the inflatable ornament. A delay module is arranged in the controller, when the controller controls the first fan 130 and the second fan 140 to work, the delay module starts timing, and when the delay module reaches a set time, the controller controls the first fan 130 and the second fan 140 to stop. The delay module in the controller can enable the first fan 130 and the second fan 140 to automatically stop working according to the signal from the delay module, thus saving energy consumption.

One side of the first airbag 210 and the second airbag 220 located inside the inflatable body 110 is provided with a wiring port. Setting the wiring port is beneficial to mounting power lines and signal transmission lines for the first fan 130 and the second fan 140, which is more convenient to mount the first fan 130 and the second fan 140, and can improve the mounting efficiency of the first fan 130 and the second fan 140. A zipper is arranged at the wiring port, which can improve air tightness of the inflatable ornament, and avoid the air of the inflatable ornament from leaking from the wiring port. In some embodiments, the inflatable ornament may be powered by an internal power supply or an external power supply, and a power line interface may be connected from the wiring port.

The inflatable body 110 or the first swinging portion 100 or the second swinging portion 120 is provided with a voice producing device, and the voice producing device is connected with the controller, which can further improve the interest of inflatable ornament. The inflatable body 110 or the first swinging portion 100 or the second swinging portion 120 is provided with a light-emitting device, and the light-emitting device is connected with the controller. The light-emitting device may emit light which passes through an outer wall surface of the inflatable ornament, so that the body of the inflatable ornament presents a luminous state, which can be more visual and entertaining. It should be understood that the inflatable body 110 may be made of colorless and transparent PVC or colored and transparent PVC materials. The light-emitting device is arranged inside the inflatable body 110, and a lampshade is mounted outside the light-emitting device. The light is refracted on the inflatable body 110 to form light spots, which makes the light change of the inflatable ornament more vivid and colorful.

The inflatable ornament is animal-shaped, and the first swinging portion 100 is at least one of a head, a tail or forelimbs of an animal model. It should be understood that the first swinging portion 100 is arranged on the head, the tail or the forelimbs of the animal model, which can make the inflatable ornament more vivid. In some embodiments, the first swinging portion 100 is arranged at the head of the inflatable ornament, and the second swinging portion 120 is arranged at the tail of the inflatable ornament, such as the inflatable ornament in the shape of a cat or a dog. In other embodiments, the first swinging portion 100 is arranged at the head of the inflatable ornament, and the second swinging portion 120 is arranged at the forelimbs of the inflatable ornament, such as the inflatable ornament in the shape of a dinosaur. In other embodiments, the first swinging portion 100 is arranged at one of the forelimbs of the inflatable ornament, and the second swinging portion 120 is arranged at the other of the forelimbs, such as the inflatable ornament in the shape of a dinosaur. In other embodiments, when the inflatable ornament is shaped like a turtle, the first swinging portion 100 is arranged at the two forelimbs of the inflatable ornament, and the second swinging portion 120 is arranged at the two rear limbs of the inflatable ornament.

The embodiments of the disclosure have been described in detail with reference to the accompanying drawings, but the disclosure is not limited to the above embodiments, and various changes may be made within the knowledge of those skilled in the art without departing from the purpose of the disclosure.

What is claimed is:

1. An inflatable ornament, comprising:

an inflatable body, the inflatable body being surrounded by a membrane material, an inflatable fan being arranged on the inflatable body, the inflatable body expanding after being inflated, a first swinging portion connected with the inflatable body, wherein a swinging drive is arranged in the first swinging portion, and the swinging drive is configured to drive the first swinging portion to swing; and a second swinging portion connected with the inflatable body, wherein the second swinging portion is connected with the first swinging portion via at least one connecting piece, and when the first swinging portion swings, the first swinging portion drives the second swinging portion to swing via the connecting piece.

2. The inflatable ornament according to claim 1, wherein the connecting piece is at least one of a connecting rod or a connecting belt.

3. The inflatable ornament according to claim 1, wherein the connecting piece comprises a first connecting piece and a second connecting piece;

the first swinging portion comprises a first swinging side and a second swinging side oppositely arranged along a swinging direction;

the second swinging portion comprises a third swinging side and a fourth swinging side oppositely arranged along the swinging direction; and the first connecting piece is connected with the first swinging side and the third swinging side, and the second connecting piece is connected with the second swinging side and the fourth swinging side.

4. The inflatable ornament according to claim 3, wherein the inflatable body is provided with a tightness adjusting device, and the tightness adjusting device is connected with the connecting piece and is used for adjusting a distance between the first swinging portion and the second swinging portion.

5. The inflatable ornament according to claim 4, wherein when the connecting piece is a connecting belt, the tightness adjusting device is a connecting shaft, the connecting belt is wound around the connecting shaft for a plurality of turns, and an outer wall of the connecting shaft is provided with an adjusting groove, shapes of the adjusting groove and the connecting belt are matched with each other, and the adjusting groove spirally extends along a direction of a center line of the connecting shaft.

6. The inflatable ornament according to claim 1, wherein the first swinging portion comprises a first airbag and a second airbag arranged oppositely, the swinging drive comprises a first fan and a second fan, the first fan is arranged in the first airbag, the second fan is arranged in the second airbag, the first fan and the second fan are alternately turned on to alternately expand the first airbag and the second airbag, the first swinging portion is driven to swing in a direction of the second airbag when the first airbag expands, and the first swinging portion is driven to swing in a direction of the first airbag when the second airbag expands.

7. The inflatable ornament according to claim 6, further comprising a controller, wherein the controller is connected with the first fan and the second fan respectively, and the controller is used for controlling the first fan and the second fan to work or stop alternately.

8. The inflatable ornament according to claim 7, further comprising a proximity sensor, wherein the proximity sensor is connected with the controller, when the proximity sensor senses that a person approaches the inflatable ornament, the proximity sensor feeds back a signal to the controller, and the controller controls the first fan and the second fan to work alternately.

9. The inflatable ornament according to claim 7, wherein a timing module is arranged in the controller, and when a flowing time reaches a time set by the timing module, the controller controls the first fan and the second fan to work alternately.

10. The inflatable ornament according to claim 7, wherein a delay module is arranged in the controller, when the controller controls the first fan and the second fan to work, the delay module starts timing, and when the delay module reaches a set time, the controller controls the first fan and the second fan to stop.

* * * * *